(12) United States Patent
Li et al.

(10) Patent No.: US 12,541,478 B2
(45) Date of Patent: Feb. 3, 2026

(54) APPARATUS AND METHODS FOR CONFIGURING BASE ADDRESS REGISTERS

(71) Applicant: ADVANCED MICRO DEVICES, INC., Santa Clara, CA (US)

(72) Inventors: Qing Li, Shanghai (CN); Buheng Xu, Beijing (CN)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 63 days.

(21) Appl. No.: 18/478,288

(22) Filed: Sep. 29, 2023

(65) Prior Publication Data
US 2025/0110908 A1 Apr. 3, 2025

(51) Int. Cl.
*G06F 13/40* (2006.01)
*G06F 12/06* (2006.01)
*G06F 13/42* (2006.01)

(52) U.S. Cl.
CPC ........ *G06F 13/404* (2013.01); *G06F 12/0653* (2013.01); *G06F 13/4221* (2013.01)

(58) Field of Classification Search
CPC . G06F 13/404; G06F 12/0653; G06F 13/4221
USPC .............. 710/3, 8, 10, 52, 62, 305
See application file for complete search history.

(56) References Cited

U.S. PATENT DOCUMENTS

| | | | | |
|---|---|---|---|---|
| 4,727,475 A | * | 2/1988 | Kiremidjian | G06F 12/0661 711/E12.086 |
| 7,743,197 B2 | * | 6/2010 | Chavan | H04L 12/4625 709/250 |
| 8,219,736 B2 | | 7/2012 | Asaro et al. | |
| 10,678,732 B1 | * | 6/2020 | Long | G06F 13/4022 |
| 11,281,453 B1 | * | 3/2022 | Ramachandran | G06F 8/65 |
| 2006/0069828 A1 | * | 3/2006 | Goldsmith | G06F 13/382 710/100 |
| 2015/0339246 A1 | * | 11/2015 | Sakurai | G06F 13/28 710/316 |
| 2020/0380035 A1 | * | 12/2020 | Bhoria | G06F 9/3004 |
| 2023/0117644 A1 | * | 4/2023 | Kamisetty | H04L 49/354 370/254 |
| 2023/0161721 A1 | * | 5/2023 | Cannata | G06F 13/4221 710/308 |

\* cited by examiner

*Primary Examiner* — Idriss N Alrobaye
*Assistant Examiner* — Henry W Yu

(57) ABSTRACT

An apparatus includes a controller that generates a configuration base address register (BAR) allocation lookup table in a first memory, such as SRAM. The configuration BAR allocation lookup table includes at least one BAR configuration entry associated with each of a plurality of peripheral devices wherein each BAR configuration entry includes configuration data for configuring at least one corresponding physical BAR associated with a corresponding peripheral device. The controller configures one or more physical BARs based on the configuration data in the configuration BAR allocation lookup table. Associated methods are also presented.

20 Claims, 7 Drawing Sheets

| Field | Width | Description |
|---|---|---|
| DEV | 2 | BAR device number. |
| FUNC | 3 | BAR function number. |
| TYPE | 1 | Indicator, <br> 0: memory space. <br> 1: IO Space |
| SIZE | 1 | memory type value, <br> 0: BAR is mapped to 32bit memory address space. <br> 1: BAR is mapped to 64bit memory address space. |
| PREF | 1 | 0: Prefetchable memory space <br> 1: Non- Prefetchable memory space |
| BAR_IDX | 3 | BAR index value(if this BAR is mapped to 64bit memory address space , it points to the BAR with LSB address bits) <br> Note: BAR_IDX could only be one of three values: 0/2/4. It means 64bit BAR index must be starting from BAR0/BAR2/BAR4. Other value will be invalid |
| IS_ROM |  | 0: ROM BAR is disabled <br> 1: ROM BAR is enabled. |
| APER_SIZE | N | Size of the BAR in bytes |
| MMIO_ADDR | M | the starting of mmio address of this BAR when it is mapped to internal mmio memory space. <br> It is possible that a single BAR will be mapped to several different internal mmio segments, then a sub decoder is supported |
| MISC | L | Other control fields . Etc. resize bar capability control. |

FIG. 4

APPARATUS AND METHODS FOR CONFIGURING BASE ADDRESS REGISTERS

BACKGROUND OF THE DISCLOSURE

Computing systems, such as cloud servers, machine learning systems or other computing systems employ integrated circuit chips that include host processors, such as processors executing instances of a Hypervisor, operating systems (OS) and/or applications and connect to peripheral devices, such as discrete graphics processors, hard disk drives, smart data acceleration interfaces (SDXI) engines, universal serial bus (USB) devices, network interface cards and other peripheral clients through an expansion bus such as a peripheral component interconnect bus. The peripheral devices are also configured to operate as physical functions (PF) and virtual functions (VF) as part of virtual machine (VM) operation. For example, a virtual function can be a lightweight peripheral component interconnect express (PCIe) function that shares one or more physical resources with the physical function and with virtual functions that are associated with that physical function.

BRIEF DESCRIPTION OF THE DRAWINGS

The implementations will be more readily understood in view of the following description when accompanied by the below figures, wherein like reference numerals represent like elements, and wherein:

FIGS. 3 and 4 are diagrams illustrating an example of a BAR configuration entry of a configuration BAR allocation lookup table in accordance with an example set forth in the disclosure;

Figure 1:
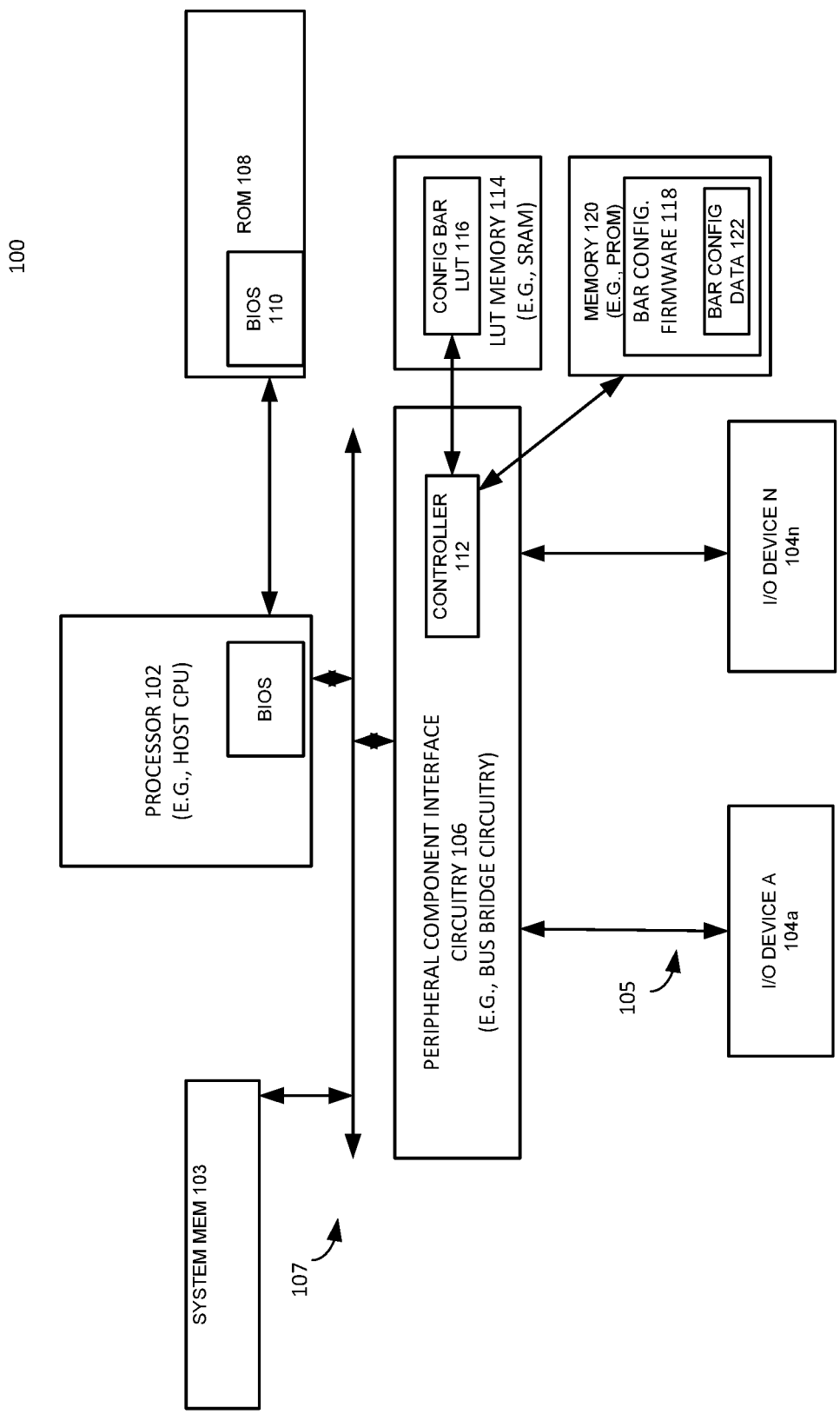
FIG. 1 illustrates a block diagram of a computer processing apparatus that employs a configuration BAR allocation lookup table in accordance with an example set forth in the disclosure.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF IMPLEMENTATIONS

The peripheral component interconnect express (PCIe) bus is one example of a peripheral component interconnect bus and is based on point-to-point topology, with separate serial links connecting devices to a root complex (host) which initializes and manages the PCIe devices. Integrated circuit chips employ interface circuitry (also referred to as bus bridge circuitry or Northbridge Interface (NBIF)) that is used between the root complex and the PCIe infrastructure for different peripheral input/output (I/O) clients and data path hubs. Endpoint ports (EPs) are associated with I/O devices and typically terminate a PCI express hierarchy.

The interface circuitry, such as through a PCI controller, typically configures base address registers (BARs) of EP functions and I/O devices using hard coded BAR configuration data for each EP function. BARs are used to address a peripheral device which can be a physical device, physical function or virtual functions. Some systems employ six BARs including one read only memory (ROM) BAR for each function. The peripheral device and/or function is enabled by being mapped into the system's I/O port address space or memory-mapped address space. When different BAR configurations are needed for a function or I/O device, or new PCIe EP functions are required, new chip register transfer level (RTL) code changes are required to change the hardcoded configuration parameters and a new integrated circuit chip needs to be designed, fabricated and tested which increases costs and reduces flexibility and scalability for integrated circuit that provide BAR configuration. There is a need for an improved BAR configuration scheme.

Systems need to define many features for each PCIe EP function's BAR. The PCIe specification defines the BAR bit structure depending on whether a BAR is for a memory space BAR or an I/O space BAR. For example the PCIe specification requires a 32 bit wide BAR register to have configuration settings, such as bit values, also referred to as BAR configuration bits, for the below defined BAR register parameters: a memory space indicator such as a bit indicating that the BAR is an I/O BAR or a memory BAR; one or more bits indicating the memory type-such as whether the BAR is mapped to a 32 bit or 64 bit memory address space; a bit indicating whether the BAR register contents are prefetchable; and a BAR MASK register to control read only (RO) bits in the BAR register to let the operating system or other executing software know the size of BAR. There are also bits (e.g., 27 bits for a base address register for memory and 30 bits for a base address register) for the base address in the BAR. These BAR configuration settings for each BAR are commonly hardcoded into the interface circuitry.

Once there are any changes to the BAR register configuration parameters or a new PCIe EP function is required to be added to the system, BAR register features and values need to be changed and the changes require RTL changes in at least the interface circuitry portion of an integrated circuit chip and needs to be regenerated and tested accordingly to accommodate the changes to the EP functions.

An apparatus, such an integrated circuit die, system on chip, die package, hardware server, laptop, desktop, mobile device or other suitable device employs a lookup table (LUT) based BAR configuration mechanism that can be reprogrammed to accommodate changes in EP functions, BAR configuration parameters or other features pertaining to BAR register configuration settings. A configuration BAR allocation LUT provides a LUT based BAR configuration mechanism wherein peripheral device functions, including EP functions have BAR configuration settings that are stored into corresponding LUT entries of the configuration BAR allocation LUT. During an initialization stage, hardware circuitry, such as a programmed controller, reads out BAR configuration data from entries in the configuration BAR allocation LUT and finishes all EP function BAR configurations.

For example, in some implementations, firmware is stored in programmable read only memory, NVRAM or other suitable memory that contains data representing the contents of the configuration BAR allocation LUT and prior to a BIOS completing initialization of the peripheral devices, the controller, such as a PCI controller in a peripheral component interface circuit, in some implementations generates the configuration BAR allocation LUT by programming the configuration BAR allocation LUT into random access memory, such as static RAM by executing the firmware. Once the configuration BAR allocation LUT is programmed in SRAM in the peripheral component interface circuit, the controller uses the configuration parameters in the configuration BAR allocation LUT to configure corresponding BAR registers for the peripheral devices in the system.

By reading out the BAR configuration settings (information) from the configuration BAR allocation LUT entries, PCIe BARs are configured (e.g., generated), for an EP function for example, and then the BAR information in the BAR is fed into a PCIe EP function address decoder. When new functions are added to the system, the programmable ROM is reprogrammed with new firmware that includes new function configuration parameters and a new configuration BAR allocation LUT is programmed by the controller prior to the BIOS operation completing. The LUT is fully configurable and brings flexibility to allow changes to peripheral devices in the system without requiring new RTL code to be generated to accommodate the changes. Also, when a BAR is mapped to internal memory space, an address sub-decoding operation is used to support multiple mapping of one BAR. For example, one BAR is assigned a continuous memory space from a system view, but at the local interface circuitry level, there may be requirements to map several discrete parts of local memory into the continuous system memory space.

In some implementations, a computer processing apparatus includes a controller that generates a configuration BAR allocation lookup table in a first memory. The configuration BAR allocation LUT includes at least one BAR configuration entry associated with each of the plurality of peripheral devices wherein each BAR configuration entry comprises configuration data for configuring at least one corresponding physical BAR associated with a corresponding peripheral device. The apparatus configures one or more physical BARs based on the configuration data.

In certain implementations the apparatus further includes the first memory including the generated configuration BAR allocation LUT and a second memory, such as a PROM including executable instructions and data representing the configuration BAR allocation lookup table. In some implementations, the controller executes the executable instructions and generates the configuration BAR allocation LUT in the first memory based on the data representing the configuration BAR allocation lookup table in the second memory, prior to a basic input output system (BIOS) initializing the plurality of peripheral devices.

In certain implementations, the controller configures the one or more physical BARs based on the configuration data by writing the configuration data from configuration BAR entries in the generated configuration BAR allocation LUT in the first memory to a configuration register space of a corresponding peripheral device of the plurality of peripheral devices.

In some implementations the controller reprograms the configuration BAR allocation LUT in the first memory based on updated data representing the configuration BAR allocation lookup table in the second memory. In certain implementations the controller stores in the configuration BAR allocation LUT, BAR configuration entries for a plurality of BARs associated with each of the plurality of peripheral devices.

In some implementations, the controller performs at least one of: using a BAR index value in an entry to combine BAR address bit widths from multiple BARs and using an aperture size value in an entry for mapping a size of memory for an associated BAR. In certain implementations, the controller provides a memory mapped input/output (MMIO) address that maps to a peripheral devices local address space based on configuration data in the configuration BAR allocation LUT.

In certain implementations a computer processing system includes a host processor, a plurality of peripheral devices and peripheral component interconnect interface circuitry, coupled to the host processor and to the plurality of peripheral devices. The peripheral component interconnect interface circuitry includes first memory; and a controller that generates a configuration BAR allocation lookup table in the first memory. The configuration BAR allocation lookup table includes at least one BAR configuration entry associated with each of the plurality of peripheral devices wherein each BAR configuration entry includes configuration data for configuring at least one corresponding physical configuration BAR associated with a corresponding peripheral device; and configures one or more physical BARs based on the configuration data.

In some implementations, the computer processing system includes a second memory comprising executable instructions and data representing the configuration BAR allocation lookup table; and the controller generates the configuration BAR allocation LUT in the first memory based on the data representing the configuration BAR allocation lookup table in the second memory. In certain implementations, the controller also operates as set forth above.

In some implementations a method for configuring base address registers associated with a plurality of peripheral devices includes generating a configuration BAR allocation lookup table in a first memory, such as SRAM using BAR configuration from a ROM prior to a BIOS completing an initialization of the peripheral devices. The configuration BAR allocation lookup table includes at least one BAR configuration entry associated with each of the plurality of peripheral devices wherein each BAR configuration entry comprises configuration data for configuring at least one corresponding physical configuration BAR associated with a corresponding peripheral device. In certain implementations, the method includes configuring one or more physical BARs based on the configuration data.

In certain implementations, the method includes generating the configuration BAR allocation LUT in the first memory based on data representing the configuration BAR allocation lookup table stored in the second memory.

In some implementations, the method includes writing the configuration data from configuration BAR entries in the generated configuration BAR allocation LUT in the first memory to a configuration register space of a corresponding peripheral device of the plurality of peripheral devices. In certain implementations the method includes reprogramming the configuration BAR allocation LUT in the first memory based on updated data representing the configuration BAR allocation lookup table in the second memory.

In some implementations, the method includes storing in the configuration BAR allocation LUT, BAR configuration entries for a plurality of BARs associated with each of the plurality of peripheral devices. In certain implementations, the method includes using a BAR index value in an entry to combine BAR address bit widths from multiple BARs, and/or using an aperture size value in an entry to map a size of memory for an associated BAR, and/or providing a memory mapped input/output (MMIO) address that maps to a peripheral devices local address space based on configuration data in the configuration BAR allocation LUT. In some implementations, the method includes configuring a plurality of physical BARs associated with an endpoint port function using the configuration data of the configuration BAR allocation lookup table.

FIG. 1 is a block diagram illustrating one embodiment of a computer processing system 100, or apparatus such as a data center server, laptop, mobile phone, internet appliance, or other suitable device that employs one or more integrated circuits such as one or more systems on chip or other integrated circuit structures. One or more processors 102, such as a host processor, are configured to execute instructions stored in system memory 103 and in some examples, a processor includes a central processing unit (CPU), graphics processing unit (GPU), accelerated processing units (APUs), machine learning unit, artificial intelligence unit or other suitable processing devices. A processor includes, in some examples, a plurality of processing cores. One or more I/O peripheral devices 104a through 104n, such as one or more GPUs, smart data acceleration interfaces (SDXI) engines, universal serial bus (USB) devices, network interface cards and other peripheral clients, communicate with the processor 102 through an expansion bus such as a peripheral component interconnect bus 105. The peripheral devices are also configured to operate as physical functions (PF) and/or virtual functions (VF) as part of virtual machine (VM) operation. For example, a virtual function can be a lightweight peripheral component interconnect express (PCIe) function that shares one or more physical resources with the physical function and with virtual functions that are associated with that physical function. As used herein a peripheral device includes a physical function and/or virtual function.

In some implementations, the peripheral component interconnect bus 105 is a peripheral component interconnect express (PCIe) bus with separate serial links connecting devices to a root complex (host processor). Peripheral component interface circuitry 106 (also sometimes referred to as bus bridge circuitry or a Northbridge Interface (NBIF)) is used to communicatively couple the processor 102 and the I/O devices 104a-104n. For purposes of illustration, the peripheral component interface circuitry 106 will be described as interfacing with a PCIe bus structure and PCIe compliant IO devices. However, it will be recognized that any suitable peripheral interconnects and peripheral devices may be employed.

The peripheral component interface circuitry 106 is used to communicatively couple the root complex (host processor) and the PCIe infrastructure for different peripheral input/output (I/O) clients and data path hubs. Endpoint Ports (EPs) are associated with I/O peripheral devices and typically terminate a PCI express hierarchy. During many operations, the peripheral component interface circuitry 106 performs operations such as translating transaction requests between the processor and the I/O peripheral devices 104a-104n, managing interrupts, and other operations. In this example, the peripheral component interface circuitry 106 is a portion of an integrated circuit that includes the processor 102 and an internal communication structure 107. However, the peripheral component interface circuitry in some implementations is a separate integrated circuit or is combined with other functions of the system as desired. In some implementations, the internal communication structure includes a data fabric connected to the host and to remote memory modules or other components. In some implementations, the internal communication structure includes an I/O hub coupled between the interface circuitry and a data fabric and is coupled to a PCIe root port. However, any suitable configuration may be employed. In this example, the peripheral component interface circuitry 106 is peripheral component interconnect interface circuitry that supports multiple devices which includes multiple device functions and uses the register configuration space for all devices and functions. However, any suitable structure may be employed.

In this example, the system 100 includes a read only memory 108 that stores firmware that serves as a BIOS 110 for the computer processing system 100. On power up, the BIOS 110 is executed by the processor 102 or other processing device within the computer processing system. On power up and before the BIOS 110 performs communication with the peripheral devices, the peripheral component interface circuitry 106 performs a type of pre-initialization operation with the peripheral devices to configure BARs for the peripheral devices using a configuration BAR allocation lookup table and configures BARs.

In some implementations, the peripheral component interface circuitry 106 includes a controller 112 and lookup table (LUT) memory 114, such as static random access memory (SRAM) that stores a configuration BAR allocation lookup table 116, also referred to as the configuration BAR allocation LUT 116, that includes BAR configuration entries associated each of the plurality of peripheral devices 104a-104n, prior to the BIOS 110 starting or prior to the BIOS 110 completing initialization of the peripheral devices. Each BAR configuration entry includes data representing configuration data for configuring at least one corresponding physical BAR associated with a corresponding peripheral device. The configuration data, such as BAR register parameter settings, from the configuration BAR allocation lookup table 116 is used to populate BAR registers associated with each of the peripheral devices. For example, a PCIe BAR structure is constructed by the controller based on LUT entry field data and exposed to the operating system or BIOS. The controller 112 configures one or more physical configuration BARs based on the configuration data from the configuration BAR allocation LUT 116. In this example, the controller 112 includes a PCI controller, and employs the configuration BAR allocation LUT 116 to configure BAR registers for EP functions and I/O devices. In some implementations, the LUT memory 114 can be a part of the peripheral component interface circuitry 106.

In some implementations, the lookup table memory 114 is static random access memory (SRAM) however any suitable memory may be employed. In some implementations, the controller 112 is a programmable microcontroller that executes firmware code referred to as base address register configuration firmware 118, stored in memory such as programmable ROM 120. In other implementations, the controller includes one or more state machines, field programmable gate arrays, application specific circuitry or suitable combination of hardware and software configured to carry out operations set forth herein. In some implementations, the base address register configuration firmware 118 includes data representing the configuration data in the configuration BAR allocation LUT 116, such as BAR configuration data 122 which in this example are BAR configuration parameters settings for all BAR registers of the system as defined by the manufactures of the peripheral devices in the form of a library, or other data structure. The firmware 118 includes instructions that when executed by the controller, cause the controller to generate the configuration BAR allocation LUT 116 into the LUT memory 114 using the BAR configuration data 122 and to operate as set forth herein. In some implementations, the controller programs the BAR configuration data 122 into the LUT memory 114 as the configuration BAR allocation LUT 116. The BAR configuration data in one example are the values that are to be stored in the entries of the configuration BAR allocation LUT 116.

In some implementations, the BAR configuration parameter settings are programmed into the configuration BAR allocation lookup table 116 by the controller 112 as part of a peripheral device initialization process and prior to the BIOS starting configuration of the peripheral devices for the operating system. When new peripheral device functions are used in the system 100 and new BAR configuration settings are required, the programmable ROM 120 is reprogrammed with updated firmware that includes new BAR configuration parameters settings and a prior configuration BAR allocation lookup table is reprogrammed or regenerated as a new configuration BAR allocation LUT using the new BAR configuration settings in the updated firmware from programmable ROM 120.

Figure 2:
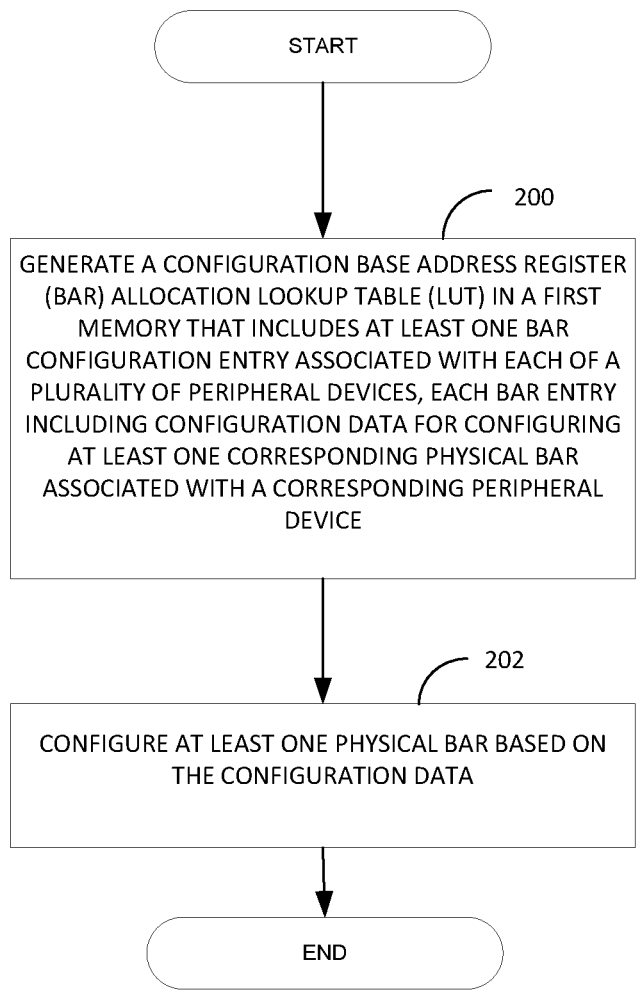
FIG. 2 is a flowchart illustrating a method for configuring base address registers associated with a plurality of peripheral devices in accordance with an example set forth in the disclosure.
Figure 3:
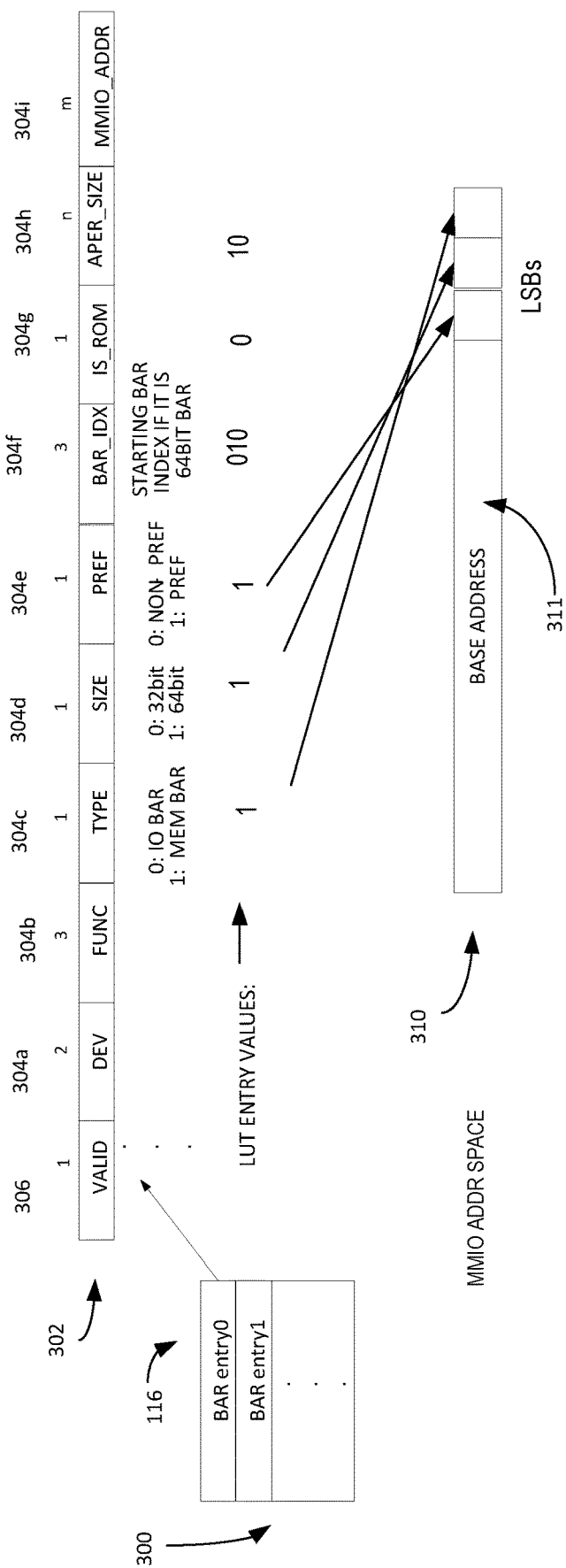

Referring also to FIGS. 2, 3 and 4 a method for configuring base address registers associated with a plurality of peripheral devices is shown and in some implementations is carried out by the controller. However, any suitable structure may be used. Also, the order of operations may also be changed if suitable for all methods disclosed herein. As shown in block 200, the method includes generating the configuration BAR allocation lookup table 116 in the LUT memory 114. The configuration BAR allocation lookup table includes a BAR configuration entry 302 for each BAR of each of the plurality of peripheral devices 104a-104n. A single function may have six or more BARs. For example, in PCIe standard, a single PCIe function can have six BARs and one ROM BAR. The controller, in response to executing the BAR configuration firmware 118, stores in the configuration BAR allocation LUT, BAR configuration entries for the plurality of BARs associated with each of the plurality of peripheral devices.

Each BAR configuration entry 302 includes configuration data for configuring at least one corresponding physical BAR 310 associated with a corresponding peripheral device. In some implementations, programming is done by the controller executing the firmware 118 that includes the BAR configuration data 122, in response to a system power on event. The executing firmware causes the controller 112 to read the BAR configuration data 122 and create BAR configuration entries, such as BAR configuration entries 300 as shown in FIG. 3, in the configuration BAR allocation lookup table 116 for all BARs for each device and function that is to be used in the system 100. As shown in FIG. 3, an example BAR configuration entry 302 has a set of bit values that represent identifier data 304a and 304b, and BAR configuration data 304c-304i, in fields of the entry. A logical "1" for valid bit 306 in the entry indicates that the entry is valid and usable to configure a BAR. The identifier data 304a in this example is a two bit device identifier that is a BAR device number for a respective peripheral device and identifier data 304b is a three bit function identifier of a peripheral device that represents a BAR function number. As shown in this example, each of the entries 302 in the configuration BAR allocation lookup table 116 includes data 304a-304i representing at least: a BAR device number for a respective peripheral device, a BAR function number, a memory type indicator, a memory bit width type, a prefetch indicator, a BAR index value, a read only memory (ROM) indicator shown as data 304g, a BAR size indicator, and a starting address of a memory management I/O space that maps to local address space associated with a corresponding peripheral device.

As shown in block 202, the method includes configuring one or more physical BARs 310 based on the configuration data. The physical BAR in some implementations is a 32 bit wide BAR with most significant bits used to store a base address 311 while least significant bit locations store configuration bits. For example, some of the BAR configuration data is copied by the controller into least significant bit locations of a physical BAR 310 in configuration register space of the associated peripheral device and other BAR configuration data is used with rules stored as part of the firmware 118. For example, the type bit 304c (memory space indicator bit), BAR size bit 304d (memory type) and prefetch indication bit 304e are copied into the physical BAR 310. The controller 112 configures each physical BAR based on the configuration data by writing the configuration data from configuration BAR entries in the generated configuration BAR allocation LUT to a configuration register space, such as a PCIe controller register space of a corresponding peripheral device of the plurality of peripheral devices. This exposes the physical BAR to the host processor. It is appreciated that the locations of the base address and copied BAR configuration data in the physical BAR 310 are shown above by ways of examples, and any reasonable locations or combination of locations (e.g., the base address occupying the least significant bits of the physical BAR 310, bits in the middle of the physical BAR 310, etc.) can be implemented.

In some implementations, some configuration data is interpreted by the controller using rules and used to configure the BAR. For example, the BAR configuration entry 302 includes a three bit BAR index field. If the BAR size bit 304d indicates that the BAR is a 64 bit bar, then the BAR index value is read. The BAR index value indicates the starting BAR out of 6 of 32 bit BARs per function that starts a 64 bit BAR combination. For example, the controller logically allocates two 32 bits bars to be a 64 bit BAR using the BAR index value. For example, if the BAR index value is 2, then the controller allocates BAR2 and BAR3 out of BAR0-BAR5 as the two logically combined 32 bit bars to make a 64 bit wide base address for a BAR while the other four BARs of the function will remain 32 bit BARs. As such, the controller 112 uses the BAR index value 304f in an entry to combine BAR address bit widths from multiple BARs. The controller 112 uses an aperture size value 304h in an entry for mapping a size of memory mapped for an associated BAR. For example, the aperture size value indicates the number of LSBs of the BAR that are read only (RO) and therefore indicates the memory size mapped by the BAR. The controller effectively calculates a mask value based on the aperture size value so that there are no direct mask values necessary. The controller 112 also uses the MMIO address value 304i which provides a memory mapped input/output (MMIO) address that maps to a peripheral devices local address space. In operation, after a BAR is configured and exposed, the host processor, via an OS or other component, initializes each PCIe peripheral device and assigns the base address 311 in system memory space. The controller, via a decoder, converts system addresses to MMIO local memory addresses when a request is received.

Figure 5:
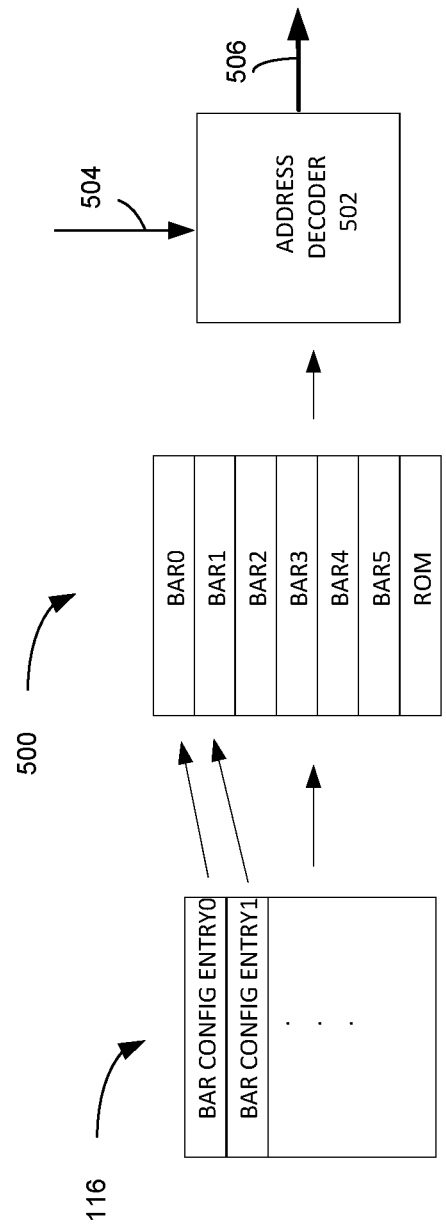
FIG. 5 illustrates a diagram showing a configuration BAR allocation lookup table being used to generate constructed BARs that are exposed to an operating system or BIOS in accordance with an example set forth in the disclosure.

FIG. 5 is a diagram illustrating an exemplary configuration BAR allocation lookup table 116 being used to generate a corresponding constructed BARs 500 that are exposed to an operating system or BIOS, and an address decoder 502 for each function that decodes incoming requests 504 that use the constructed BARs 500 that are exposed. When each physical BAR is constructed from the configuration data in the configuration BAR allocation LUT 116, they are exposed in a conventional manner pursuant, for example to the PCIe standard. For example, in the PCIe standard, each PCIe function can have six BARs and one ROM BAR (e.g., as shown in the BARs 500). The address decoder 502, such as in a PCIe controller, checks an incoming address in a request 504 from an OS or BIOS with an address in the BAR. If a match is found, the request is sent as shown by arrow 506 to the corresponding function for processing.

Figure 6:
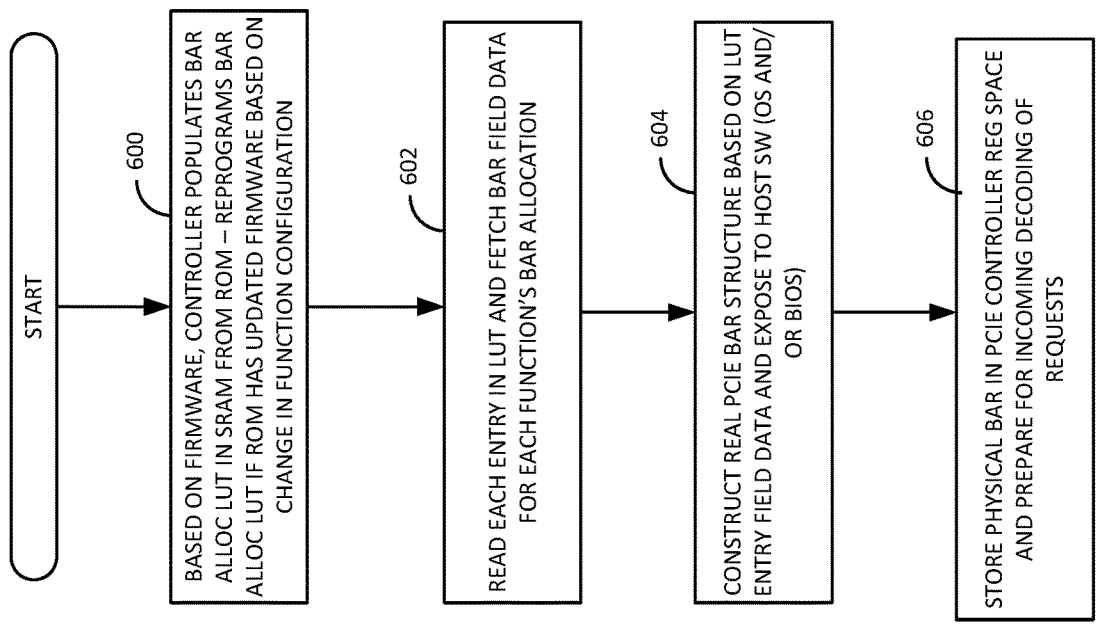
FIG. 6 is a flowchart illustrating a method for configuring base address registers associated with a plurality of peripheral devices in accordance with an example set forth in the disclosure.

FIG. 6 is a flowchart illustrating an exemplary method for configuring base address registers associated with a plurality of peripheral devices and in some implementations is carried out by the controller, however any suitable structure may be employed. As shown in block 600, the method includes based on firmware, the configuration BAR allocation LUT 116 is generated, (e.g., via the controller) in SRAM from data in the ROM. In some implementations the controller or other circuitry generates the configuration BAR allocation LUT 116 by programming the BAR configuration data 122 in the ROM as the configuration BAR allocation LUT 116. For example, the BAR configuration data 122 is copied to the memory 114 as the configuration BAR allocation LUT 116. However, the configuration BAR allocation LUT 116 may be generated in any suitable manner. In some implementations, the configuration BAR allocation LUT is reprogrammed or modified (e.g., via the controller) in the SRAM based on updated data representing the configuration BAR allocation lookup table in the ROM. For example, the controller reprograms the configuration BAR allocation LUT 116 if the firmware in ROM has been updated with firmware that includes a change in function configuration defined by a change in BAR configuration data 122.

As shown in block 602, once the configuration BAR allocation LUT is populated, each entry in the configuration BAR allocation LUT is read (e.g., via the controller) and field data, such as the configuration data is fetched to allocate or configure each function's BAR. As shown in block 604, a PCIe BAR structure is constructed (e.g., via the controller) for each BAR of an associated function based on the data in each entry in the configuration BAR allocation LUT as described above and the BAR structure is exposed to the host processor. The host processor, such as an OS can access the bar number, type, size, and other information by reading these BARs. As shown in block 606, the method includes storing (e.g., via the controller or the host processor) each physical bar in PCIe controller configuration register space and prepare for incoming decoding of requests.

Figure 7:
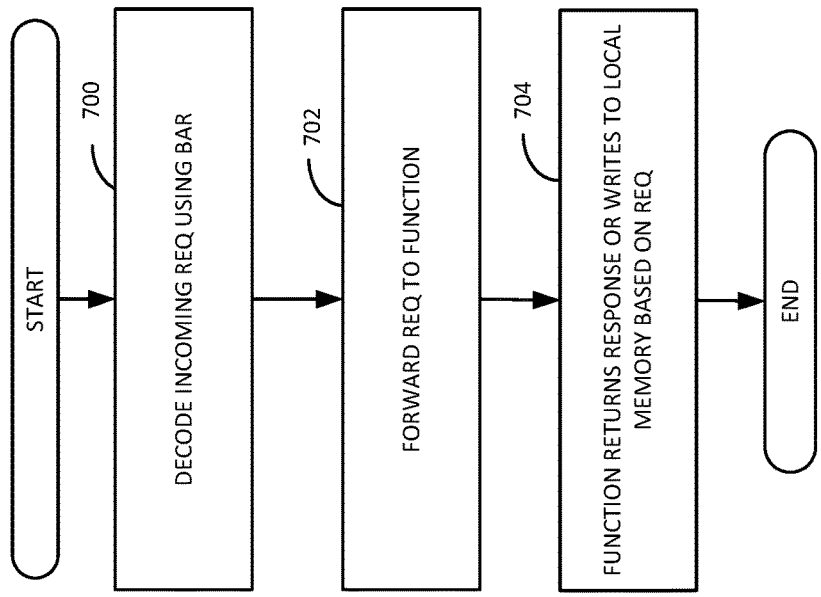
FIG. 7 is a flowchart illustrating a method for decoding an incoming request in accordance with an example set forth in the disclosure.

FIG. 7 is a flowchart illustrating a method for decoding an incoming request in accordance with an example set forth in the disclosure. In some implementations, the method shown in FIG. 7 can be executed via an address decoder (e.g., address decoder 502). As shown in block 700, the method includes decoding an incoming request using the constructed and exposed BARs as previously described with reference to FIG. 5. When the request is approved, as shown in block 702, the method includes forwarding the request to the corresponding function. As shown in block 704, the function of the peripheral device carries out the request and returns a response or writes to local memory based on the request.

Figure 8:
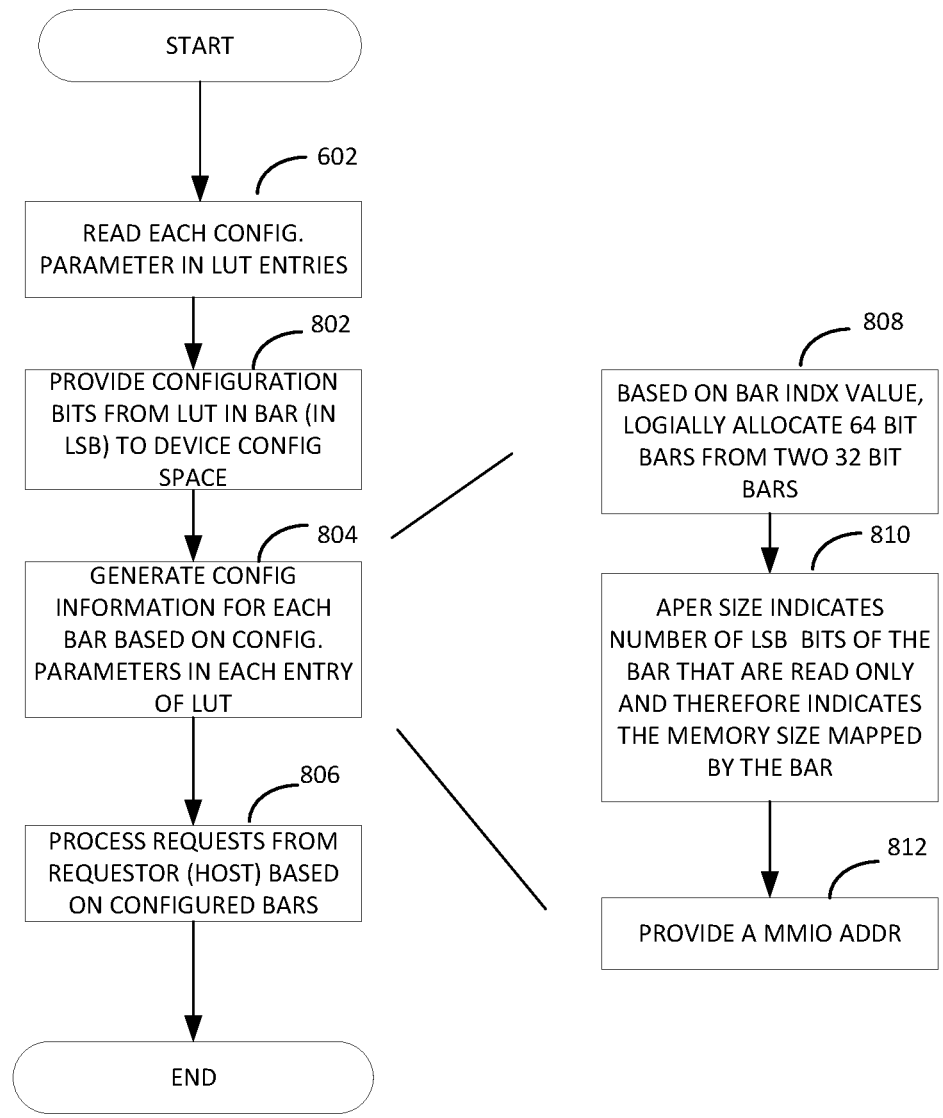
FIG. 8 is a flowchart illustrating a method for configuring base address registers associated with a plurality of peripheral devices in accordance with an example set forth in the disclosure.

FIG. 8 is a flow chart illustrating a more detailed method for configuring base address registers associated with a plurality of peripheral devices and in some implementations is carried out by, for example the controller, however any suitable structure may be employed. As shown in block 602 after the configuration BAR allocation LUT 116 is stored in the SRAM, the method includes reading each configuration parameter in the configuration BAR allocation LUT entries and as shown in block 802, providing configuration bits such as from type bit 304c, size bit 304d and prefetch bit 304e, in the configuration BAR allocation LUT into the corresponding LSB locations to controller configuration space. As shown in block 804, the method includes generating BAR configuration information for each BAR based on configuration parameters in an entry of the configuration BAR allocation lookup table 116. For example, BAR configuration is based on configuration data such as a BAR index value 304f and an aperture size value 304h that are applied to rules in the firmware to generate a fully configured BAR, as described above. As shown in block 806 once the BARS are configured and exposed to the host processor, requests are processed from requesters such as an operating system, based on the configured bars.

Referring back to block 804, as shown in block 808 in some implementations, two 32 bit BARs are logically allocated as a 64 bit BAR based on the BAR index value 304f. As shown in block 810 the aperture size value 304h is used to determine the memory size that is mapped by the BAR. As shown in block 812, a MMIO address such as MMIO address value 304i is determined and the value is stored in the configuration BAR allocation LUT. This is a local memory address. In some implementations, for the usage of aperture size value 304h, aperture size is the memory space size mapped by the BAR. For example, as defined in PCIe space, read only (RO) bits in the BAR register represent the BAR size. The aperture size=2**(RO bits number). By getting the aperture size, the controller controls the RO bits width of a BAR. For MMIO address usage, the MMIO address value 304i is the EP function local MMIO address which is mapped to a system address in a BAR. Also, when a single BAR will be mapped to several discrete local MMIO segments, then a sub-decoder is supported.

Among other technical advantages, the LUT approach provides a reprogrammable and more flexible and less expensive approach to configuring BARs for peripheral devices and in some implementations provides for more BAR configuration parameters to be employed as changes to peripheral devices are developed. The LUT approach as set forth herein also eliminates the need for hardcoded BAR configuration structure in a peripheral device interface circuit or bus bridge circuit.

Although features and elements are described above in particular combinations, each feature or element can be used alone without the other features and elements or in various combinations with or without other features and elements. The apparatus described herein in some implementations use software or firmware stored on a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). The data stored on the non-transitory computer readable storage medium can then be used (i.e., executed) to create systems (e.g., boards, integrated circuits) that implement various embodiments of the invention.

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that al, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. A computer processing apparatus comprising:
   a controller configured to:
   generate a configuration base address register (BAR) allocation lookup table (LUT) in a first memory that comprises at least one BAR configuration entry associated with each of a plurality of peripheral devices wherein each of the at least one BAR configuration entry comprises configuration data for configuring at least one corresponding physical BAR associated with a corresponding peripheral device of the plurality of peripheral devices; and
   configure the at least one physical BAR based on the configuration data.

2. The apparatus of claim 1 further comprising:
   the first memory comprising the configuration BAR allocation LUT; and
   a second memory comprising executable instructions and data representing the configuration BAR allocation LUT,
   wherein the controller is configured to generate the configuration BAR allocation LUT in the first memory based on the data representing the configuration BAR allocation LUT in the second memory, prior to a basic input output system (BIOS) initializing the plurality of peripheral devices.

3. The apparatus of claim 1 wherein the controller is configured to configure the at least one physical BAR based on the configuration data by writing the configuration data from the at least one configuration BAR entry in the configuration BAR allocation LUT in the first memory to a configuration register space of the corresponding peripheral device of the plurality of peripheral devices.

4. The apparatus of claim 2 wherein the controller is configured to reprogram the configuration BAR allocation LUT in the first memory based on updated data representing the configuration BAR allocation LUT in the second memory.

5. The apparatus of claim 1 wherein the controller is further configured to store in the configuration BAR allocation LUT, BAR configuration entries for a plurality of BARs associated with the plurality of peripheral devices.

6. The apparatus of claim 1 wherein the controller is further configured to perform at least one of:
   using a BAR index value in an entry to combine BAR address bit widths from multiple BARs, or
   using an aperture size value in an entry for mapping a size of memory for an associated BAR.

7. A computer processing system comprising:
   a host processor;
   a plurality of peripheral devices;
   peripheral component interconnect interface circuitry, operatively coupled to the host processor and to the plurality of peripheral devices, comprising;
   first memory; and
   a controller, operatively coupled to the first memory, and configured to:
   generate a configuration base address register (BAR) allocation lookup table (LUT) in the first memory that comprises at least one BAR configuration entry associated with each of the plurality of peripheral devices wherein each of the at least one BAR configuration entry comprises configuration data for configuring at least one corresponding physical configuration BAR associated with a corresponding peripheral device of the plurality of peripheral devices; and
   configure the at least one physical BAR based on the configuration data.

8. The computer processing system of claim 7 further comprising:
   a second memory comprising executable instructions and data representing the configuration BAR allocation LUT; and
   wherein the controller is configured to generate the configuration BAR allocation LUT in the first memory based on the data representing the configuration BAR allocation LUT in the second memory, prior to a basic input output system (BIOS) initializing the plurality of peripheral devices.

9. The computer processing system of claim 7 wherein the controller is configured to configure the at least one physical BAR based on the configuration data by writing the configuration data from the at least one configuration BAR entry in a configuration BAR allocation LUT in the first memory to the configuration register space of a corresponding peripheral device of the plurality of peripheral devices.

10. The computer processing system of claim 8 wherein the controller is configured to reprogram the configuration BAR allocation LUT in the first memory based on updated data representing the configuration BAR allocation LUT in the second memory.

11. The computer processing system of claim 7 wherein the controller is further configured to store in the configuration BAR allocation LUT, BAR configuration entries for a plurality of BARs associated with the plurality of peripheral devices.

12. The computer processing system of claim 7 wherein the controller is further configured to perform at least one of:
using a BAR index value in an entry to combine BAR address bit widths from multiple BARs, or using an aperture size value in an entry for mapping a size of memory for an associated BAR.

13. The computer processing system of claim 7 wherein the controller is further operative to configure a plurality of physical BARs associated with an endpoint port function using the configuration data of the configuration BAR allocation LUT.

14. A method for configuring base address registers associated with a plurality of peripheral devices comprising:
generating a configuration base address register (BAR) allocation lookup table (LUT) in a first memory that comprises at least one BAR configuration entry associated with each of the plurality of peripheral devices wherein each of the at least one BAR configuration entry comprises configuration data for configuring at least one corresponding physical configuration BAR associated with a corresponding peripheral device of the plurality of peripheral devices; and
configuring the at least one physical BAR based on the configuration data.

15. The method of claim 14 comprising generating the configuration BAR allocation LUT in the first memory based on data representing the configuration BAR allocation LUT stored in a second memory.

16. The method of claim 14 comprising writing the configuration data from configuration BAR entries in the configuration BAR allocation LUT in the first memory to a configuration register space of the corresponding peripheral device of the plurality of peripheral devices.

17. The method of claim 16 comprising reprogramming the configuration BAR allocation LUT in the first memory based on updated data representing the configuration BAR allocation LUT in a second memory.

18. The method of claim 14 comprising storing in the configuration BAR allocation LUT, BAR configuration entries for a plurality of BARs associated with each of the plurality of peripheral devices.

19. The method of claim 14 comprising, using a BAR index value in an entry to combine BAR address bit widths from multiple BARs and using an aperture size value in an entry to map a size of memory for an associated BAR.

20. The method of claim 14 further comprising configuring a plurality of physical BARs associated with an endpoint port function using the configuration data of the configuration BAR allocation LUT.

* * * * *